United States Patent [19]
Gelb

[11] Patent Number: 5,647,456
[45] Date of Patent: Jul. 15, 1997

[54] CHAIN LUBRICATING SYSTEM

[76] Inventor: Joseph Gelb, 26061 Bridger St., Moreno Valley, Calif. 92555

[21] Appl. No.: 637,946

[22] Filed: Apr. 25, 1996

[51] Int. Cl.$^6$ ................................................ F16N 7/16
[52] U.S. Cl. ........................ 184/15.2; 184/15.3; 184/16; 184/17
[58] Field of Search ........................ 184/7.4, 15.1, 184/15.2, 15.3, 17

[56] References Cited

U.S. PATENT DOCUMENTS

| | | |
|---|---|---|
| 587,409 | 8/1897 | Taylor . |
| 653,445 | 7/1900 | Garland . |
| 1,053,030 | 2/1913 | Harbison . |
| 2,541,301 | 2/1951 | Sissler ................................ 184/17 |
| 3,684,059 | 8/1972 | Stoner ................................ 184/15.1 |
| 3,720,289 | 3/1973 | Moldenhauer . |
| 3,724,582 | 4/1973 | Wood . |
| 3,896,901 | 7/1975 | Ango . |
| 4,120,380 | 10/1978 | Mann . |
| 4,593,923 | 6/1986 | Thalmann ........................ 184/15.1 |
| 4,648,486 | 3/1987 | Kayser et al. .................... 184/15.1 |
| 4,783,186 | 11/1988 | Manning et al. . |
| 4,815,637 | 3/1989 | Nellis . |
| 4,977,979 | 12/1990 | King, Sr. et al. ................. 184/15.1 |
| 5,253,984 | 10/1993 | Gruett et al. ..................... 184/15.2 |
| 5,285,871 | 2/1994 | Sievenpiper ...................... 184/7.4 |

*Primary Examiner*—Thomas E. Denion
*Attorney, Agent, or Firm*—Sheldon & Mak

[57] ABSTRACT

A chain drive lubricator includes a pressure gas source; a lubricant reservoir, the reservoir having a gas inlet, a lubricant outlet, and means for receiving the lubricant, and a movable piston separating the gas from the lubricant. A gas valve connected between the source of pressurized gas and the reservoir inlet has first and second closed positions and an intermediate open position, and valve biasing means for moving from the second position to the first position, the gas valve being fixably supported relative to a control member movably supported by the vehicle frame, a flexible conduit extending between the gas valve and the reservoir inlet. An applicator for applying the lubricant onto the chain is connected by a feed conduit to the reservoir outlet. A one-way pressure valve is connected between the outlet and the applicator and has a seat and a closure element that is displaced from the seat in response to fluid flow through the valve from the reservoir, pressure biasing means urging the closure element into sealing engagement with the seat, for preventing flow of the lubricant from the outlet absent a predetermined pressure of the lubricant upstream of the pressure valve. The control member can be a handlebar. The applicator has a roller with valve members for inhibiting lubricant flow except when contacted by the chain. Alternatively, the applicator has a plurality of angled scraper blades for removing contamination from the chain, and a nozzle for directing the lubricant onto the chain.

17 Claims, 1 Drawing Sheet

CHAIN LUBRICATING SYSTEM

BACKGROUND

The present invention relates to lubrication of chain drives, and more particularly to vehicle chain drives such as those of bicycles, motorcycles and the like.

Bicycles and motorcycles have become very popular as off-road vehicles, being used informally as well as in heavily sponsored and highly competitive sporting events. Under these conditions the typical chain drive is subject to excessive wear and jamming caused by contamination with dirt and mud. Chain lubricators for bicycles and motorcycles are known, being disclosed, for example in U.S. Pat. No. 653,435 to Garland, U.S. Pat. No. 3,720,289 to Moldenhauer, and U.S. Pat. No. 4,120,380 to Mann.

The lubricators of the prior art are not entirely satisfactory in that they exhibit one or more of the following disadvantages:

1. They are ineffective in providing a desired amount and distribution of lubrication, particularly rough terrain when the flow of lubricant is controlled by hand operation of a pump or valve and/or when there is insufficient control to provide a desired burst of lubrication as well as to inhibit the flow of lubricant;
2. They are subject to excessive contamination and clogging by dirt, mud, and the like; and
3. They are dangerous and difficult to use in rugged terrain in that a rider must release the handlebar with one hand while operating a pump or valve.

Hand-held lubricators are also known, being disclosed, for example, in U.S. Pat. No. 4,783,186 to Manning et al. And U.S. Pat. No. 4,815,637 to Nellis. Aside from being unsuitable for use while the vehicle is being ridden, these lubricators have limited effectiveness in that they employ aerosol-packaged lubricants that are available in only limited variety.

Thus there is a need for a drive chain lubricator that overcomes the disadvantages of the prior art.

SUMMARY

The present invention meets this need by providing a chain drive lubrication system that is effective, highly efficient, safe, and easy to use. In one aspect of the invention, the lubrication system includes a source of pressurized gas; a reservoir for holding a supply of liquidic lubricant, the reservoir having an inlet for receiving pressurized gas, an outlet for the lubricant, and means for receiving the lubricant; a momentary gas valve fluid connected between the source of pressurized gas and the inlet of the reservoir; an applicator for applying the lubricant onto the chain; a feed conduit fluid connected between the outlet of the reservoir and the applicator; and a pressure valve fluid connected between the outlet and the applicator for preventing flow of the lubricant from the outlet absent a predetermined pressure of the lubricant upstream of the pressure valve.

The reservoir can include a housing having a gas chamber, a lubricant chamber, and a movable barrier separating the gas chamber from the lubricant chamber. The reservoir can have a cylindrical inside surface, the removable barrier including a piston sealingly movable along the cylindrical inside surface. The means for receiving the lubricant can include an openable fill port fluid connected to the lubricant chamber, the reservoir further including an openable bleed port fluid connected to the gas chamber for exhausting gas from the gas chamber when the fill port is open. Preferably the system further includes barrier biasing means for moving the barrier toward the inlet when the fill and bleed ports are open.

The pressure valve can include a one-way valve having a closure element and a seat, the closure element being displaced from the seat in response to fluid flow through the valve from the reservoir, and pressure biasing means for urging the closure element into sealing engagement with the seat. The pressure valve can be fixedly connected to the reservoir.

The gas valve can have first and second closed positions and an intermediate open position, and valve biasing means for moving from the second position to the first position. The base frame can be a vehicle frame, a control member being movably supported relative to the vehicle frame, the reservoir being fixably supported relative to the vehicle frame, the gas valve being fixedly supported relative to the control member, a flexible conduit extending between the gas valve and the inlet of the reservoir. The source of pressurized gas can be a pressure cartridge that is fixably supported relative to the base frame.

The applicator can include a cylindrical roller member having a bore and an outside surface, a feed passage extending from the bore to the outside surface; a dispenser valve member supported within the feed passage and having open and closed positions, the feed passage being blocked in the closed position wherein the valve member projects to outside of the outside surface; dispenser biasing means for yieldingly holding the valve member in the closed position, the valve member moving to the open position in response to contact with the chain; and a roller shaft for rotatably supporting the roller member and having a distribution passage formed therein, and means for fluid-connecting the distribution passage between the feed conduit and the feed passage of the roller member.

The applicator can further include a pair of antifriction bearing assemblies connected to the roller shaft and rotatably supporting the roller member, the feed passage being located between the bearing assemblies, the means for fluid-connecting the distribution passage including each of the bearing assemblies having a seal device for confining lubricant between the bearing assemblies. The applicator can include a plurality of dispenser valve members that are movable in a corresponding feed passage of each roller member.

The applicator can include a support member having a chain passage therein for receiving a portion of the chain, the chain portion moving along a chain path; a nozzle mounted to the support member, the nozzle being oriented for spraying the chain and having means for fluid-connecting the feed conduit; a plurality of resilient scraper members, each scraper member being formed for contacting rollers of the chain and being oriented obliquely to the chain path for laterally displacing contamination from the chain, the support member being formed for permitting contamination removed from the chain to pass laterally out of the support member. The scraper members can be formed with a herringbone blade pattern.

DRAWINGS

These and other features, aspects, and advantages of the present invention will become better understood with reference to the following description, appended claims, and accompanying drawings, where:

DESCRIPTION

Figure 1:
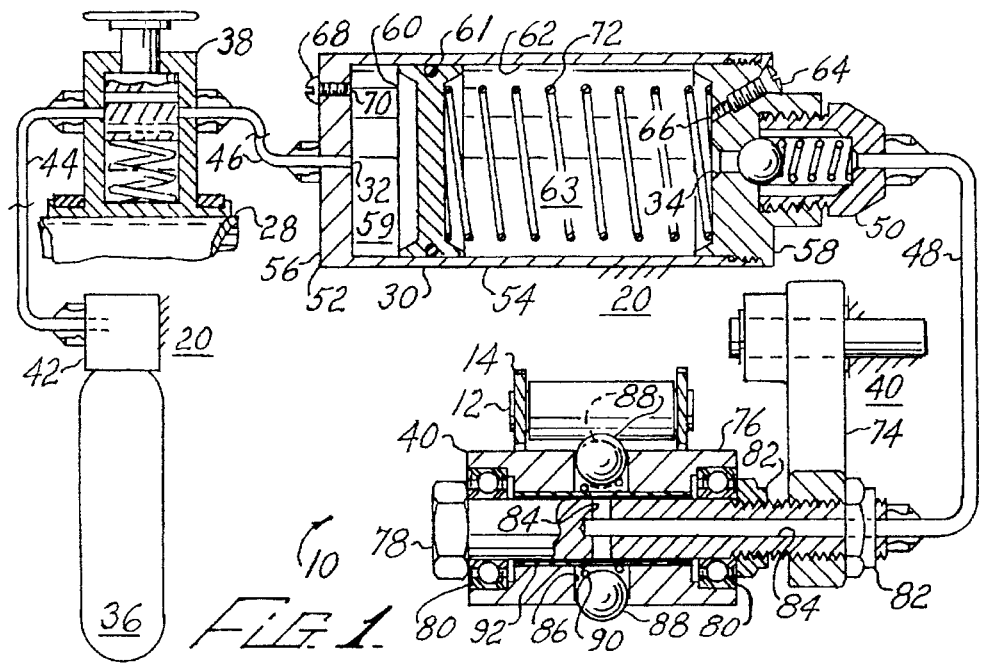
FIG. 1 is an fragmentary sectional diagramic view of a chain drive lubricator according to the present invention.
Figure 2:
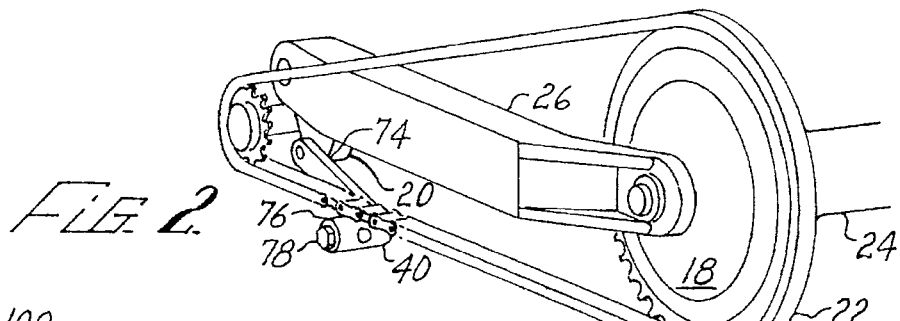
FIG. 2 is a perspective view showing a portion of the lubricator of FIG. 1 as installed on a motorcycle.

The present invention is directed to a drive chain lubrication apparatus that is particularly suitable for off-road vehicles such as bicycles and motorcycles. With reference to FIGS. 1 and 2 of the drawings, a lubrication apparatus 10 according to the present invention is installed in association with a chain drive 12 having a closed loop of chain 14 operatively connecting a drive sprocket 16 and a driven sprocket 18, the drive sprocket being rotatably mounted relative to a base frame 20. The chain drive 12 typically is included in a wheeled vehicle 22, the driven sprocket 18 being rotatably mounted together with a drive wheel hub 24 on a suspension arm 26 of the vehicle 22, the arm 26 being pivotally connected to the base frame 20 in a conventional manner. The vehicle 22 also includes a movable handlebar 28 for directional control, other control elements such as for braking (not shown) being typically mounted to the handlebar 28. The lubrication apparatus 10 includes a reservoir 30 having a gas inlet 32 and a lubricant outlet 34, a source of pressurized gas which can be a replaceable $CO_2$ cartridge 36, a gas valve 38 fluid-connected between the cartridge 36 and the gas inlet 32 of the reservoir 30, and an applicator 40 fluid-connected to the lubricant outlet 34 for directing lubricant onto the chain 14. In an exemplary configuration of the apparatus 10, the gas valve 38 is fixedly mounted to the handlebar 28 for safe and convenient operation thereof by a rider of the vehicle 20. The cartridge 36 is removably supported by a receptacle 42, a flexible supply conduit 44 extending between the receptacle 42 and the gas valve 38. Another flexible conduit, designated control conduit 46, extends between the gas valve 38 and the gas inlet 32 of the reservoir 30. The conduits 44 and 46 can be made from small-diameter plastic tubing, with connections being made by conventional commercially available fittings or other suitable means. A further flexible conduit, designated feed conduit 48, extends between the reservoir 30 and the applicator 40, the reservoir 30 being configured as a unit incorporating a pressure valve 50 for limiting the flow of lubricant as further described below. The feed conduit 48 can also be made from small-diameter plastic tubing, but normally of larger diameter than the conduits 44 and 46 for accommodating the higher viscosity of lubricant as compared with $CO_2$ gas. Preferably, however, the feed conduit 48 is only sufficiently large for promoting free lubricant flow in response to upstream pressure, being sufficiently small for inhibiting drainage downstream of a blockage, as further described below.

As shown in FIG. 1, the reservoir 30 includes a rigid housing 52 having a cylindrical portion 54, an inlet head portion 56, and an outlet head portion 58. The gas inlet 32 is formed in the inlet head portion 56 for feeding a gas chamber 59 from the control conduit 46. A barrier piston 60 is movably supported within the housing 52 between the inlet 32 and the outlet 34, the piston 60 having a resilient O-ring 61 in sealing engagement with a cylindrical inside surface 62 of the cylindrical portion 54 for isolating the gas chamber 59 from a lubricant chamber 63 of the reservoir 30. The lubricant outlet 34 is formed in the outlet head portion 58, in fluid communication with the lubricant chamber 63.

Thus the piston 60 is effective for maintaining the lubricant substantially isolated from the $CO_2$ gas, whereby the lubricant but not the gas flows from the outlet 34 in response to gas pressure.

A fill screw 64 threadingly engages the outlet head portion 56 of the housing 52 for sealingly closing a fill port 66. Similarly, a bleed screw 68 sealingly closes a bleed port 70 of the inlet head portion 56. Also, a compression spring 72 is interposed between the piston 60 and the outlet head portion 58 for retracting the piston 60 when the fill and bleed ports are open.

As indicated in FIG. 1, the reservoir 30 and the receptacle 42 can be fixedly supported relative to the base frame 20 in any suitable manner. In the exemplary configuration of FIGS. 1 and 2, the applicator 40 is pivotally supported relative to the base frame 20 on an applicator arm 74. It will be understood, however, that in some applications the applicator can be fixed relative to the frame 20 in an appropriate location for contacting the chain 14, an appropriate location being proximate the drive sprocket 16 when the wheel hub 24 of the vehicle 20 is located by a movable suspension arm 26 as in FIG. 2. Also appropriate in some cases is mounting the applicator 40 to the suspension arm 26, particularly when the arm 26 pivots about an axis proximate the drive sprocket 16.

In the configuration of FIGS. 1 and 2, the applicator 40 includes a roller 76 that is rotatably supported on a roller shaft 78 by a pair of ball bearings 80, the roller shaft 78 threadingly engaging the applicator arm 74. The roller 76 is supported on the shaft 78 by a pair of anti-friction or ball bearings 80. In the exemplary configuration of FIG. 1, the shaft 78 is headed and respective lock nuts 82 are used for fixing the shaft 78 relative to the arm 74, and for securing the bearings 80 relative to the headed end of the shaft 78.

According to the present invention, the roller shaft 78 is preferably hollow, being fluid-connected between the feed conduit 48 and the roller 78, by a distribution passage 84, the roller 78 having one or more radial feed passages 86 for feeding the lubricant onto the chain 14. Each feed passage 86 holds a contact-actuated valve member 88 for inhibiting the flow of lubricant except when the chain 14 is being contacted thereby. More particularly, the valve members 88 are smoothly spherical, being biased outwardly against partial closures of the feed passages 86 by respective valve springs 90, the springs 90 being supported against contact with the shaft 78 by a perforated sleeve 92, the sleeve 92 being fixedly supported within the roller 76. The bearings 80 are preferably of sealed construction for confining lubricant therebetween. The valve members 88 project outwardly beyond the roller 76 in respective closed positions thereof, being moved radially inwardly by contact with the chain 14 to respective open positions wherein the lubricant can flow onto the chain 14.

In operation, short bursts of gas flow from the $CO_2$ cartridge 36 enter the gas chamber 59 upon activation of the gas valve 38, resulting in pressure being applied to the lubricant chamber 63 by the piston 60. Once sufficient lubricant pressure is applied to the pressure valve 50 through the outlet 34 of the reservoir 30, lubricant pressure is also produced in the feed conduit 48, whereupon lubricant flows from the roller 76 onto the chain 14 in response to inward displacement of the valve members 88 when the chain 14 contacts same. The flow is inhibited, for example, when the chain 14 passes clear of the roller 76, and when the valve members 88 are not displaced by the chain. Also, when the gas valve 38 is no longer being activated, lubricant flow into the feed conduit 48 is terminated at a predetermined pressure differential across the pressure valve 50. This effects a substantial termination of flow from the applicator 40 in that the pressure valve 50 blocks further flow into the conduit 48 when the pressure within the gas chamber 59 falls to a threshold magnitude, and drainage of the conduit 48 is inhibited by a combination of lubricant viscosity and surface tension, whether or not any of the valve members 88 are displaced to their open positions by the chain 14. Nevertheless, continued operation of the chain drive 12 after exhaustion of the lubricant from the reservoir (or without activation of the gas valve 38) may result in drainage from the feed conduit 48. Thus it is preferred that the feed conduit 48 be transparent or translucent for visual indication of such drainage, facilitating corrective action.

Figure 3:
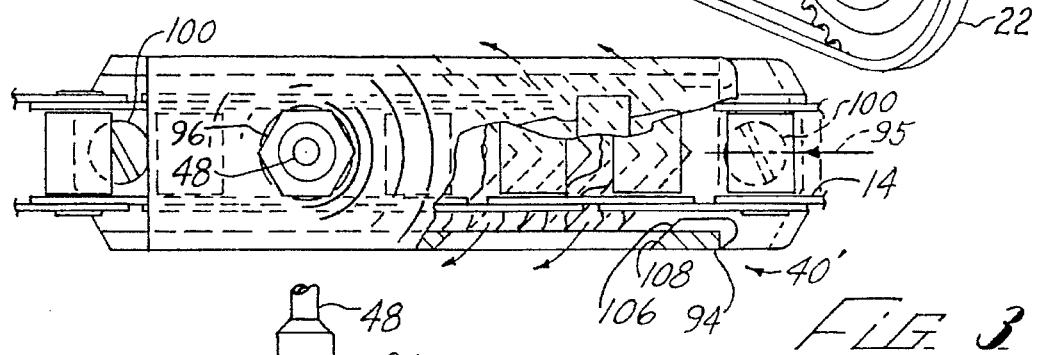
FIG. 3 is a fragmentary sectional plan view showing an alternative configuration of the lubricator of FIG. 1.
Figure 4:
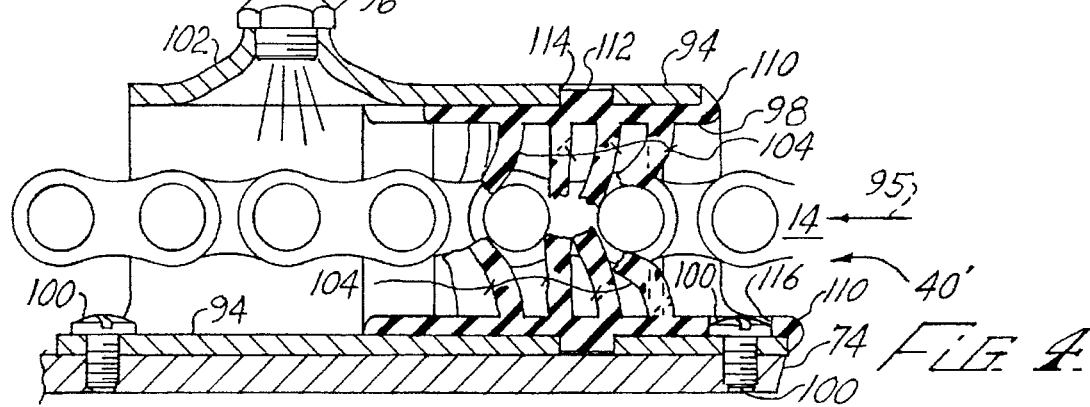
FIG. 4 is an sectional elevational view of the lubricator portion of FIG. 3.

With further reference to FIGS. 3 and 4, an alternative configuration of the applicator, designated 40', includes a tubular body 94 through which the chain 14 travels on a chain path 95, a nozzle 96 that is fed fluid-connected to the feed conduit 48, and a resilient scraper 98. The body 94 is fastened to the applicator arm 74 by a pair of screw fasteners 100. It will be understood that the body 94 can likewise be mounted to the suspension arm 26, and that the body 94 can be formed integrally with either of the arms 26 and 74. The fasteners 100 are oriented for threaded engagement with the arm 74 (or 26), this orientation being convenient for use with the arm 26 which is typically tubular or otherwise configured such that threaded engagement of the fasteners into the body 94 is inconvenient or impractical. Of course, the fasteners 100 can be inverted in appropriate cases, making threaded engagement with the body 94. The nozzle 96 is mounted by threaded engagement with an enlargement or boss portion 102 of the body 94, being oriented for directing lubricant onto the passing chain 14.

According to the present invention, the scraper 98 has at least one and preferably a plurality of resilient blade portions 104 contacting opposite upper and lower surfaces of the chain 14, at least some of the blade portions 104 being oriented obliquely to the chain path 95 for laterally displacing contamination such as mud and dirt from the chain 14. As best shown in FIG. 3, the blade portions 104 are V-shaped in plan, together forming respective herringbone patterns above and below the chain 14, the contamination being laterally displaced to opposite sides of the chain 14 by the blade portions 104. The scraper 98 has respective side openings 106 for passing the contamination, and the tubular body 94 has respective exhaust openings 108 aligned therewith for preventing clogging of the scraper 98, the contamination being substantially exhausted from the openings 108 on opposite sides of the applicator 40'.

The scraper 98 can be molded or otherwise formed of a resilient material such as rubber, polyethylene or other suitable polymer. The scraper 98 can be formed in one piece in an open configuration with the blade members 104 projecting in the same direction, the scraper 98 being folded with upper and lower ones of the blade members 104 in facing relation for insertion into the tubular body 94. Alternatively, U-shaped portions of the scraper 98 can be formed separately and then installed in facing relation within the body 94. The scraper 98 is retained axially within the body 94 by one or more of a flange portion 110 that rests against the body 94, boss portions 112 that project into respective openings 114 of the body 94, and a clearance hole 116 that is formed in the scraper 98 for engaging a portion of one of the fasteners 100.

Thus the present invention provides an effective means for cleaning as well as lubricating chain drives under adverse conditions of vibration and/or contamination. The lubrication apparatus 10 is also effective installed on stationary equipment having a movable member requiring periodic or continuous lubrication.

Although the present invention has been described in considerable detail with reference to certain preferred versions thereof, other versions are possible. For example, the reservoir 30 and/or the receptacle 42 and the $CO_2$ cartridge 36 can be mounted within an air box that is a conventional part of many existing motorcycles. Also, a conventional male/female quick-disconnect fitting can be used at one end of the control conduit 46 so that the cartridge 36 can be used as an auxiliary source of pressurized gas, such as to inflate tires of the vehicle 22, with the flow being controllable by the gas valve 38. Further, the body 94 of the applicator 40' can have an inverted U-shaped cross-section, the scraper 98 being retained between the body 94 and the applicator arm 74 (or the suspension arm 26). Therefore, the spirit and scope of the appended claims should not necessarily be limited to the description of the preferred versions contained herein.

What is claimed is:

1. A lubrication system for a chain drive having a closed loop of chain connecting drive and driven sprockets, the drive sprocket being rotationally supported relative to a base frame, the system comprising:

(a) a source of pressurized gas;
   (b) a reservoir for holding a supply of liquidic lubricant, the reservoir having an inlet for receiving pressurized gas, an outlet for the lubricant, and means for receiving the lubricant;
   (c) a momentary gas valve fluid connected between the source of pressurized gas and the inlet of the reservoir, the gas valve having first and second closed positions and an intermediate open position, and valve biasing means for moving from the closed positions to the open position;
   (d) an applicator for applying the lubricant onto the chain;
   (e) a feed conduit fluid connected between the outlet of the reservoir and the applicator; and
   (f) a pressure valve fluid connected between the outlet and the applicator for preventing flow of the lubricant from the outlet absent a predetermined pressure of the lubricant upstream of the pressure valve.

2. The system of claim 1, wherein the reservoir comprises a housing having a gas chamber connected to the inlet, a lubricant chamber connected to the outlet, and a movable barrier separating the gas chamber from the lubricant chamber.

3. The system of claim 2, wherein the reservoir has a cylindrical inside surface, and the movable barrier comprises a piston sealingly movable along the cylindrical inside surface.

4. The system of claim 2, wherein the means for receiving the lubricant comprises an openable fill port fluid connected to the lubricant chamber, the reservoir further comprising an openable bleed port fluid connected to the gas chamber for exhausting gas from the gas chamber when the fill port is open.

5. The system of claim 4, further comprising barrier biasing means for moving the barrier toward the inlet when the fill and bleed ports are open.

6. The system of claim 1, wherein the pressure valve comprises a one-way valve having a closure element and a seat, the closure element being displaced from the seat in response to fluid flow through the valve from the reservoir, and pressure biasing means for urging the closure element into sealing engagement with the seat.

7. The system of claim 6, wherein the pressure valve is fixedly connected to the reservoir.

8. The system of claim 1, wherein the base frame is a vehicle frame, a control member being movably supported relative to the vehicle frame, and wherein the reservoir is fixably supported relative to the vehicle frame, the gas valve being fixedly supported relative to the control member, a flexible conduit extending between the gas valve and the inlet of the reservoir.

9. The system of claim 8, wherein the source of pressurized gas is a pressure cartridge, the pressure cartridge being fixably supported relative to the base frame.

10. A lubrication system for a chain drive having a closed loop of chain connecting drive and driven sprockets, the drive sprocket being rotationally supported relative to a base frame, the system comprising:
   (a) a source of pressurized gas;
   (b) a reservoir for holding a supply of liquidic lubricant, the reservoir having an inlet for receiving pressurized gas, an outlet for the lubricant, and means for receiving the lubricant;
   (c) a momentary gas valve fluid connected between the source of pressurized gas and the inlet of the reservoir;
   (d) an applicator for applying the lubricant onto the chain, the applicator comprising:
      (i) cylindrical roller member having a bore and an outside surface, a feed passage extending from the bore to the outside surface;
      (ii) a dispenser valve member supported within the feed passage and having open and closed positions, the feed passage being blocked in the closed position wherein the valve member projects to outside of the outside surface;
      (iii) dispenser biasing means for yieldingly holding the valve member in the closed position, the valve member moving to the open position in response to contact with the chain; and
      (iv) a roller shaft for rotatably supporting the roller member, the roller shaft having a distribution passage formed therein, and means for fluid-connecting the distribution passage between the feed conduit and the feed passage of the roller member;
   (e) a feed conduit fluid connected between the outlet of the reservoir and the applicator; and
   (f) a pressure valve fluid connected between the outlet and the applicator for preventing flow of the lubricant from the outlet absent a predetermined pressure of the lubricant upstream of the pressure valve.

11. The system of claim 10, wherein the gas valve has first and second closed positions and an intermediate open position, and valve biasing means for moving from the second position to the first position.

12. The system of claim 10, wherein the applicator further comprises a pair of antifriction bearing assemblies connected to the roller shaft and rotatably supporting the roller member, the feed passage being located between the bearing assemblies, and wherein the means for fluid-connecting the distribution passage comprises each of the bearing assemblies having a seal device for confining lubricant between the bearing assemblies.

13. The system of claim 10, wherein the applicator further comprises a plurality of dispenser valve members, each of the valve members being movable in a corresponding feed passage of the roller member.

14. A lubrication system for a chain drive having a closed loop of chain connecting drive and driven sprockets, the drive sprocket being rotationally supported relative to a base frame, the system comprising:
   (a) a source of pressurized gas;
   (b) a reservoir for holding a supply of liquidic lubricant, the reservoir having an inlet for receiving pressurized gas, an outlet for the lubricant, and means for receiving the lubricant;
   (c) a momentary gas valve fluid connected between the source of pressurized gas and the inlet of the reservoir;
   (d) an applicator for applying the lubricant onto the chain, the applicator comprising:
      (i) a support member having a chain passage therein for receiving a portion of the chain, the chain portion moving along a chain path;
      (ii) a nozzle mounted to the support member, the nozzle being oriented for spraying the chain and having means for fluid-connecting the feed conduit; and
      (iii) a plurality of resilient scraper members, each scraper member being formed for contacting rollers of the chain and being oriented obliquely to the chain path for laterally displacing contamination from the chain, the support member being formed for permitting contamination removed from the chain to pass laterally out of the support member;
   (e) a feed conduit fluid connected between the outlet of the reservoir and the applicator; and
   (f) a pressure valve fluid connected between the outlet and the applicator for preventing flow of the lubricant from the outlet absent a predetermined pressure of the lubricant upstream of the pressure valve.

15. The system of claim 14, wherein the scraper members are formed with a herringbone blade pattern.

16. The system of claim 14, wherein the gas valve has first and second closed positions and an intermediate open position, and valve biasing means for moving from the second position to the first position.

17. A lubrication system for a chain drive having a closed loop of chain connecting drive and driven sprockets, the drive sprocket being rotationally supported relative to a vehicle frame, a control member being movably supported relative to the vehicle frame, the system comprising:
   (a) a source of pressurized gas;
   (b) a reservoir fixably supported relative to the vehicle frame for holding a supply of liquidic lubricant, the reservoir having a cylindrical inside surface, an inlet for receiving pressurized gas, an outlet for the lubricant, and an openable fill port for receiving the lubricant, the reservoir including a housing having a gas chamber, a lubricant chamber, and a piston separating the gas chamber from the lubricant chamber, the piston being sealingly movable along the cylindrical inside surface, the reservoir further comprising an openable bleed port fluid connected to the gas chamber for exhausting gas from the gas chamber when the fill port is open;
   (c) a momentary gas valve fluid connected between the source of pressurized gas and the inlet of the reservoir, the gas valve having first and second closed positions and an intermediate open position, and valve biasing means for moving from the second position to the first position, the gas valve being fixably supported relative to the control member, a flexible conduit extending between the gas valve and the inlet of the reservoir;
   (d) an applicator for applying the lubricant onto the chain;

(e) a feed conduit fluid connected between the outlet of the reservoir and the applicator; and (f) a one-way pressure valve fluid connected between the outlet and the applicator, the one-way valve having a closure element and a seat, the closure element being displaced from the seat in response to fluid flow through the valve from the reservoir, and pressure biasing means for urging the closure element into sealing engagement with the seat, for preventing flow of the lubricant from the outlet absent a predetermined pressure of the lubricant upstream of the pressure valve.

* * * * *